Patented Nov. 2, 1948

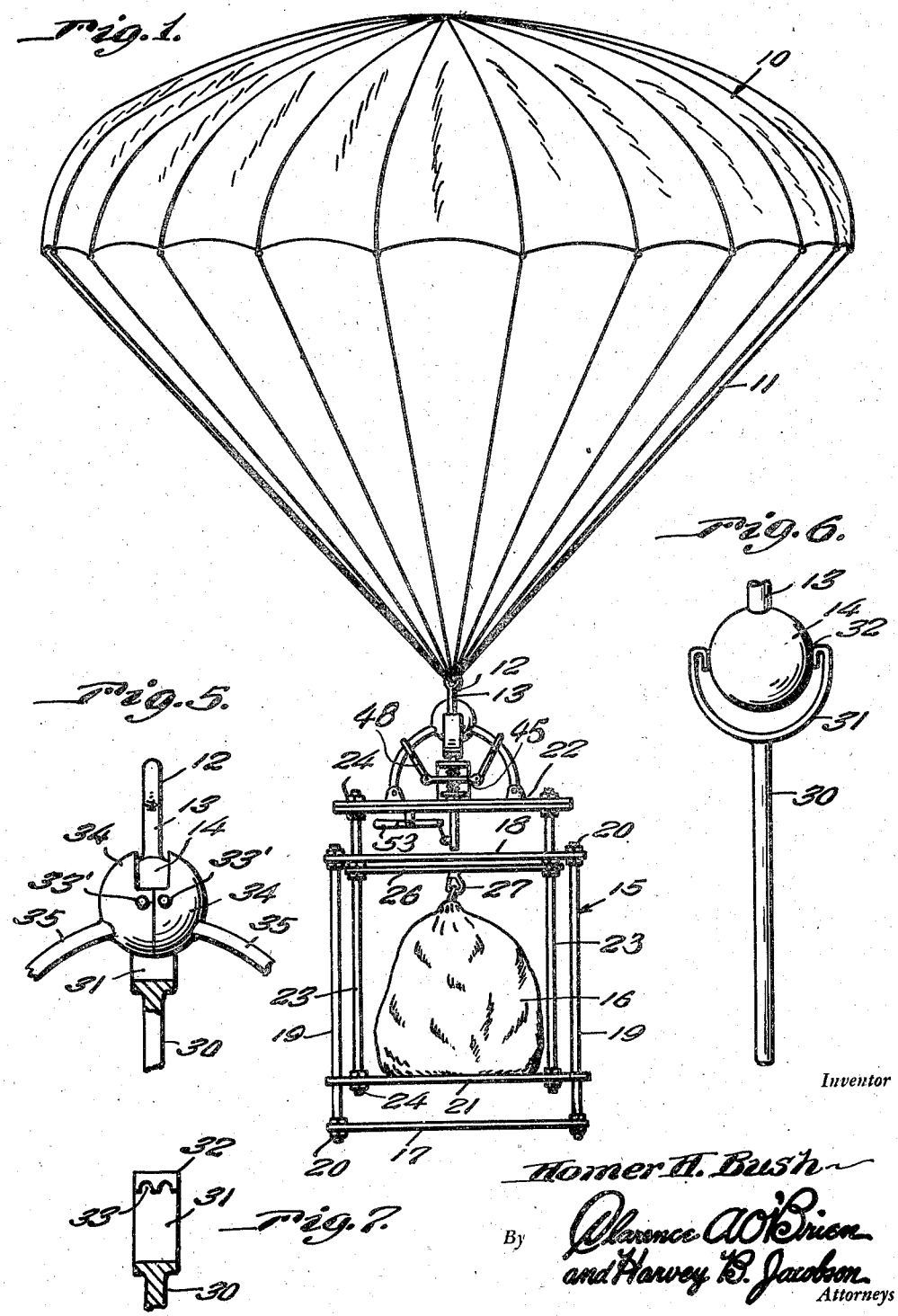

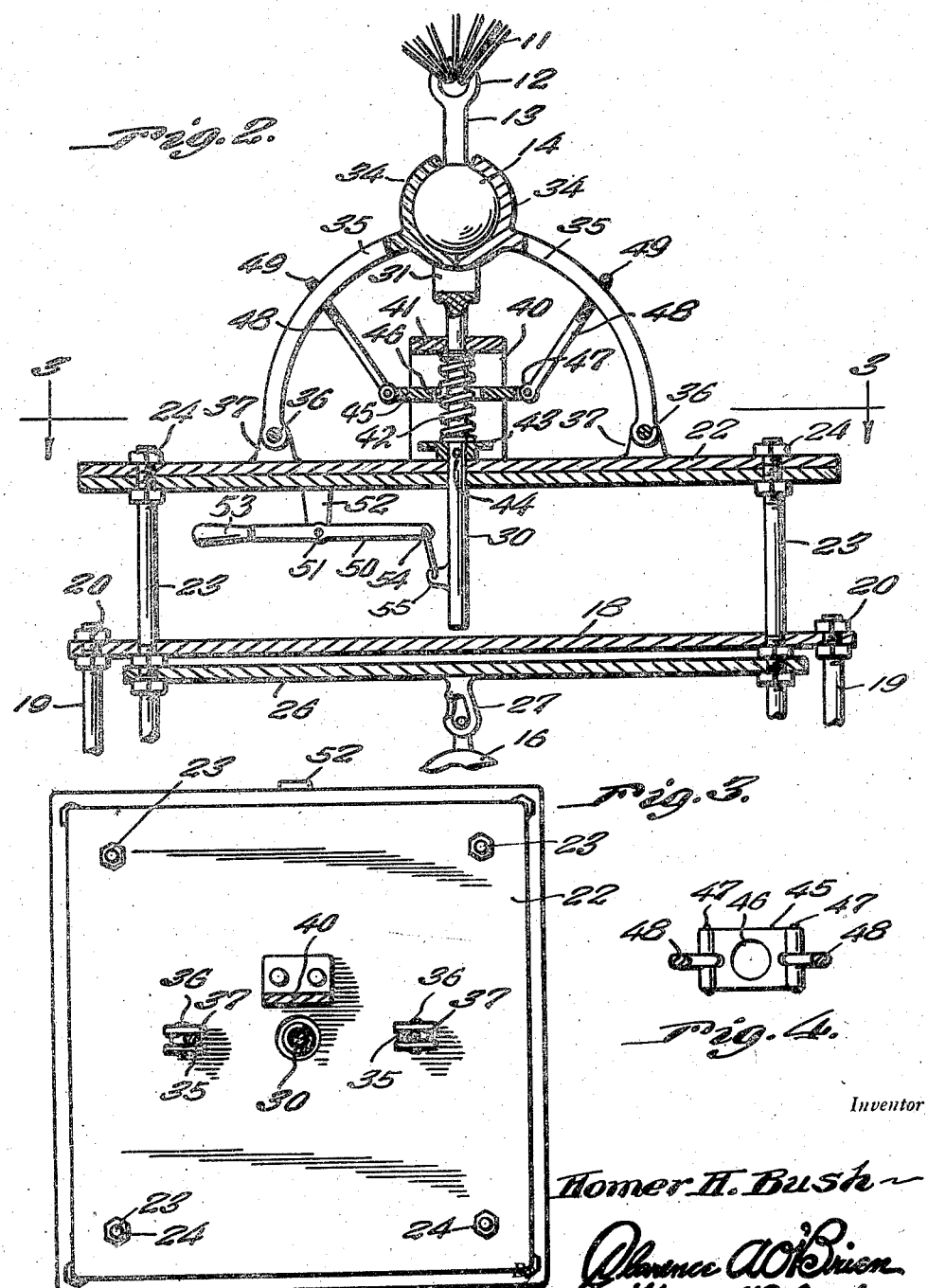

2,452,990

UNITED STATES PATENT OFFICE 2,452,990

PARACHUTE RELEASE

Homer H. Bush, Atlanta, Ga.

Application October 1, 1945, Serial No. 619,625

4 Claims. (Cl. 244—138)

This invention relates to a parachute release, and more particularly to such a release adapted to be actuated automatically upon striking the ground or similar obstruction.

A primary object of this invention is to provide automatic release mechanism for parachutes, whereby the load carried by the parachute will be released from the silk upon striking the ground, or the like.

An additional object of the invention is the provision of such a release which will be promptly effective to disengage the load from the parachute silk immediately upon landing.

A further object of the invention is the provision of such an automatic release provided with manual release means, whereby the load in the parachute may be disengaged manually if desired.

Still another object resides in the provision of such a device which will be sturdy and durable in construction, reliable and efficient in operation, and relatively simple and inexpensive to manufacture, assemble and operate.

Other objects will in part be obvious and in part be pointed out as the description of the invention proceeds and shown in the accompanying drawings, wherein there is disclosed a preferred embodiment of this inventive concept.

In the drawings:

Figure 1 is a side elevational view of one form of release embodying the instant invention shown in association with a parachute and a load supported thereby, Figure 2 is an enlarged longitudinal sectional view of the release mechanism per se, Figure 3 is a sectional view taken substantially along the line 3—3 of Figure 2 as viewed in the direction indicated by the arrows.

Figure 4 is a top plan view, partially broken away, of a constructional detail,

Figure 5 is a fragmentary side elevational view of a portion of the release mechanism, Figure 6 is a side elevational view of an additional portion of the release mechanism, and Figure 7 is a sectional view taken substantially along the center line of a portion of the release mechanism as shown in Figure 6.

Similar reference characters refer to similar parts throughout the several views of the drawings.

Having reference now to the drawings, and more particularly to Figure 1, there is generally indicated at 10 a parachute of silk, or the like, and of conventional design provided with a plurality of depending cords 11 secured at their lower extremity to a loop 12, formed in the end of a member 13, the lower extremity of which is suitably embedded and secured to a ball 14 (see Fig. 6).

Secured to the ball 14, in a manner to be more fully described hereinafter, is a cage or framework, generally indicated at 15, adapted to support the load 16 carried by the parachute. The cage 15 consists of an outer frame comprised of a striker or impact plate 17 and a top plate 18 secured together, as by longitudinally extending rods 19, held in position as by nuts 20 at the extremities thereof, and an inner frame including a load-supporting plate 21, and a top plate 22 similarly connected by rods 23 and secured in related assembly as by means of nuts 24 on the extremities of the rods 23. The base plate or load-supporting plate 21 is provided adjacent its corners with a plurality of apertures adapted to embrace the rods 19 which serve as guides therefor, and correspondingly the rods 23 extend through suitable aligned apertures in the top plate 18 of the outer frame. An intermediate plate 26 of the inner frame is positioned below the plate 18, and has depending therefrom a latching hook 27 to which the load is adapted to be secured.

From the foregoing it will be seen that there is a limited relative play between the inner and outer frames, such play being in a relatively vertical direction, and limited by the distance between the top plate 22 and the intermediate plate 26. Obviously when the two cages supporting the load 16 fall, the lower striking plate 17 strikes the ground first, and the weight of the load 16 on the plate 21 causes the latter to move downwardly toward the plate 17, which action obviously causes the upper plate 18 to move upwardly, which movement releases the latch means 34 holding the parachute 10 to the framework 15, in a manner now to be described.

This movement of the plate 18 serves to move a latch rod 30, Figs. 2, 5, 6 and 7, extending through an aperture in the top plate 22, which latch rod terminates at its upper extremity in a bifurcated portion 31, the bifurcations of which terminate in inwardly turned latching members 32, the inner face of each of which is provided with a pair of indentations 33, adapted to engage, when the rod 30 is in its lowermost latching position, protuberances 33' carried on opposite sides of a pair of oppositely disposed hemispherical members 34, each positioned on an arcuate rod or stem 35, and adapted to embrace the ball 14. The arcuate members 35 are pivotally secured, as by means of pivot pins 36, to lugs 37 secured to the top portion of the plate 22.

A bracket 40 extends upwardly from an intermediate portion of the plate 22 adjacent the rod 30, and is provided with an inwardly turned flange 41 having an aperture therein through which the rod 30 passes. A coil spring 42 surrounds rod 30 and abuts with one end the flange 41, and with its other end a flange collar 43 pinned, as by a pin 44, to rod 30. Obviously, the arrangement is such as normally to bias the rod 30 downwardly, and accordingly the notches 33 into engagement with the protuberances 33' carried by the hemispherical members 34, thus serving normally to latch the member 32 tightly about the ball 14, and thus hold the load-supporting frame and the parachute in related assembly.

Positioned between the flange 41 and the collar 43 about the rod 30 is a plate 45 having an aperture 46 therein, to the extremity of which are pivotally secured, as on pivots 47, arms 48 (see Fig. 4). Arms 48 terminate in loops 49 adapted to surround the arcuate members 35.

From the foregoing, the operation of the device should now be readily understandable. When the plate 18 is forced upwardly in the manner previously described, it strikes the lower extremity of the rod 30, which in turn moves upwardly together with the flange collar 43 against the bias of the spring 42 to release the latching mechanism previously described, holding the hemispherical members 34 in related assembly with the ball 14. Simultaneously, upward movement of the collar 43 striking the plate 45 causes the same to move upwardly, which in turn moves the arms 48 downwardly, which, through the loops 49, cause the separation of the arcuate members 35 and their associated hemispherical members 34. Thus it will be readily apparent that the parachute 10 is immediately released from the load-carrying frame 15, and that the frame 15 with its associated load 16 remains where it falls, regardless of any drag exerted by wind or the like against the parachute 10.

Under certain conditions, it may be desirable to release the parachute from the frame by manual means, which means take the form of a lever 50 pivotally mounted, as by a pivot 51, to a lug 52 extending from the side of the top plate 22. The lever is provided at one end with a handle 53, and at its other end with a link 54 which engages a suitable lug 55 secured adjacent the lower extremity of the rod 30. Obviously, downward pressure exerted on the handle 53 will lift the rod 30 to release the latch mechanism in the manner previously described.

Obviously the parachute may be used by an individual, as well as an inert load, in which case suitable straps may be provided to secure the individual to the platform.

From the foregoing, it will now be seen that there is herein provided a device accomplishing all of the objects of this invention; and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative, and not in a limiting sense.

I claim:

1. In a release device, a parachute, a cord secured thereto, a ball secured to the cord of said parachute, a load-carrying cage, a pair of hemispherical members pivotally secured to said cage adapted to encompass said ball, a latch securing said members about said ball, and an impact-operated trigger rod for releasing said latch, said cage including an inner frame having a top plate and an outer frame having a top plate beneath said inner-frame top plate and an impact plate, in said outer frame, the impact of said impact plate causing said top plate of the inner frame to actuate said trigger rod.

2. In a release device, a parachute, a cord secured thereto, a ball secured to the cord of said parachute, a load-carrying cage, a pair of hemispherical members pivotally secured to said cage adapted to encompass said ball, a latch securing said members about said ball, an impact-operated trigger rod for releasing said latch, and spring means biasing said latch toward latching position.

3. In a release device, a parachute, a cord secured thereto, a ball secured to the cord of said parachute, a load-carrying cage, a pair of hemispherical members pivotally secured to said cage adapted to encompass said ball, a latch securing said members about said ball, and an impact-operated trigger rod for releasing said latch, said latch including a notched keeper and said hemispherical members having protuberances thereon engageable by said keeper.

4. A parachute release device comprising a ball adapted to be secured to a parachute, a load carrying cage, a pair of hemispherical members, pivotally secured to said cage and adapted to encompass said ball, a latch securing said members about said ball, a trigger rod slidably secured in said cage for releasing said latch and means exterior of said cage for releasing said members from encompassing relation with said ball.

HOMER H. BUSH.

REFERENCES CITED

The following references are of record in the file of this patent:

UNITED STATES PATENTS

| Number | Name | Date |
| --- | --- | --- |
| 545,411 | Mootham | Aug. 27, 1895 |
| 1,981,461 | Miller | Nov. 20, 1934 |